UNITED STATES PATENT OFFICE.

THOMAS M. THOM, OF WOOD GREEN, ENGLAND.

MANUFACTURE OF ARTIFICIAL STONE.

SPECIFICATION forming part of Letters Patent No. 687,080, dated November 19, 1901.

Application filed February 12, 1901. Serial No. 47,060. (No specimens.)

*To all whom it may concern:*

Be it known that I, THOMAS MATHIESON THOM, a subject of the Queen of Great Britain, residing at 59 Lordship Lane, Wood Green, in the county of Middlesex, England, have invented new and useful Improvements in the Manufacture of Artificial Stone, of which the following is a specification.

The present invention relates to improvements in the manufacture of artificial stone from limestone, which limestone is burned, ground, molded into blocks, and finally re-carbonated.

Although the "carbonation" of lime is a familiar expression, it is, in fact, an operation of extreme difficulty when blocks of pressed lime three or four inches thick are to be treated. The carbonic-acid gas will penetrate the exterior of the block fairly easily; but soon a hard coating or shell is formed, which seems to retard and ultimately to stop the process before the carbonation of the interior is complete. To facilitate the operation of carbonation, the employment of large volumes of carbonic-acid gas at a high pressure in an inclosed space has been suggested. Perfect success by this means has not, however, so far resulted. In carrying out this invention I employ also a large volume of gas and gas-pressure in a closed vessel. I so conduct the process, however, that where formerly, owing to imperfect knowledge of the action of the gas on the lime, only partial success was obtained complete penetration of the blocks by the gas is now insured.

According to the present invention the process of artificial-stone manufacture is conducted in the following manner: Pure lime, or preferably a mixture of pure lime and unburned limestone in proportions of one-third to two-thirds, each reduced to the condition of a fine powder, is taken and slaked with water. Only such an amount of water is used as will bring the mixture to a suitable consistency for molding. In this way the operation of drying before molding is rendered unnecessary, and an economy is thereby incidentally effected. After molding the blocks are dried, as usual, and then introduced into a closed vessel capable of resisting an internal pressure of three hundred to four hundred pounds to the square inch. Into this closed vessel carbonic-acid gas is introduced first at a comparatively low pressure—say from thirty to forty pounds. The carbonic-acid gas at this pressure in the first stages of the operation serves by chemical action upon the ingredients in the stone to generate heat to about 90° Fahrenheit, during the maintenance of which the induration of the stone by the penetration of the gas will go on, while the moisture still remaining in the stone is being gradually driven off. This temperature must be maintained or the carbonation will be interrupted. I therefore according to this invention increase the gas-pressure within the carbonating vessel as soon as there are any signs of a decrease of heat. The increase or pressure has to be repeated from time to time. It will be found that to convert a block of lime say, four inches thick and three feet or four feet square into a pure carbonate an ultimate pressure of gas of from three hundred to three hundred and fifty pounds to the square inch will be gradually reached, the temperature of 90° Fahrenheit, or thereabout, being continually maintained. Carbonic-acid gas having been introduced into the vessel containing the lime-blocks or blocks of artificial stone, chemical action on the outside of the blocks is first set up and a temperature of 90° Fahrenheit, or thereabout, is created if the volume of carbonic acid is properly proportioned to the capacity of the contents of the containing vessel. When the exterior of the blocks has been acted on, the chemical action begins to cease and the temperature to fall, because the carbonic acid cannot reach the uncarbonated lime. If, however, more carbonic acid is introduced at increased pressure, it will penetrate the coating of carbonate of lime already formed and begin action on the interior, thereby creating heat afresh and maintaining the temperature of about 90° Fahrenheit aforesaid.

It may here be explained that as a fairly high gas-pressure as well as heat is necessary to insure thorough carbonation it will not be desirable to place too many stones in the carbonating vessel at one time; otherwise in obtaining the desired gas-pressure an injuriously high temperature will be generated, owing to the free space within the vessel being too small.

The carbonic-acid gas required can be obtained in the requisite volume by calcining the limestone in a closed kiln by means of hydrogen gas and carbonic oxid, to which is added a supply of oxygen, atmospheric air being at the same time carefully excluded. The gas given off during the calcining of the lime is washed and stored in a suitable container, ready for use in a carbonating vessel.

Stones thus produced are suitable for use, when polished, as lithographic stones, or they may be employed for a variety of other purposes and are as durable as natural stones or marble and as capable of resisting climatic and other influences.

What I claim as my invention, and desire to secure by Letters Patent, is—

The process of manufacturing artificial stone as above described, consisting in the treatment of blocks of lime in an atmosphere of carbonic-acid gas under pressure, said pressure ranging from, say, thirty pounds to the square inch at the beginning, to, say, three hundred and fifty pounds to the square inch at the end of the operation, the pressure being so regulated that the chemical action of the carbonic acid on the stone will maintain a temperature of about 90° Fahrenheit, substantially as set forth.

In testimony whereof I have signed my name to this specification in the presence of two subscribing witnesses.

T. M. THOM.

Witnesses:
L. U. REDDIE,
P. A. NEWTON.